US005474846A

United States Patent [19]

Haldenby

[11] Patent Number: 5,474,846

[45] Date of Patent: Dec. 12, 1995

[54] UNIFORM POLYMERIC COATED INTERIOR CYLINDER SURFACE

[76] Inventor: George A. Haldenby, 1730 Blackwell Rd., Sarnia, Ontario N7X 1A8, Canada

[21] Appl. No.: 9,128

[22] Filed: Jan. 26, 1993

[51] Int. Cl.[6] ........ F16L 57/00

[52] U.S. Cl. ........ 428/369; 428/35.8; 428/36.91; 428/332; 428/461; 220/454; 220/457; 220/465; 220/581; 220/582; 220/583; 220/586

[58] Field of Search ........ 428/35.7, 35.8, 428/35.9, 36.9, 36.91, 36.92, 332, 461; 220/457, 454, 582, 586, 581, 583, 465; 427/230, 231, 234

[56] References Cited

U.S. PATENT DOCUMENTS

| | | | |
|---|---|---|---|
| 1,387,451 | 8/1921 | Campbell | 220/583 |
| 2,294,858 | 9/1942 | Allen | 220/581 |
| 2,419,915 | 4/1947 | Priest et al. | 220/454 |
| 4,595,614 | 6/1986 | Nanlist | 428/35 |
| 4,994,308 | 2/1991 | Tarancon | 427/255.1 |

*Primary Examiner*—Ellis P. Robinson
*Assistant Examiner*—Michael A. Williamson

[57] ABSTRACT

The present invention provides a method for coating the interior surface of a cylinder with a uniform, relatively thick layer of a polymeric material. The method includes the steps of dispersing a particulate polymeric material into the interior cavity of a cylinder. Any openings in the cylinder are then closed. The cylinder is then subjected to rotational movement while at the same time subjecting the cylinder to oscillation in a vertical plane. The polymeric material is then heated to a temperature above the melting point of the polymeric material, and maintained at that temperature for a time sufficient to coat the polymeric material onto the interior surface of the cylinder. The rotation and oscillation of the cylinder is then halted and the polymeric material is cooled.

6 Claims, 2 Drawing Sheets

UNIFORM POLYMERIC COATED INTERIOR CYLINDER SURFACE

FIELD OF THE INVENTION

The present invention relates generally to a steel cylinder which has been treated to provide a uniform coating of a polymeric material on the interior surface of the cylinder. More particularly, the present invention relates to a method for coating the interior surface of a cylinder with a polymeric material in a manner such that none of the interior surface of the cylinder including the threaded neck portion comes into contact with any gas or liquid stored in the cylinder.

BACKGROUND OF THE INVENTION

Metal cylinders, particularly steel cylinders, cannot be used to store many reactive gases, since the reactive gas would attack the metal of the cylinder. This is particularly important in certain industries, such as computer chip manufacture, which require very high purity gases during the manufacturing process. It is known to coat the interior of metal cylinders with a plastic coating to prevent attack by reactive gases. The known processes for coating the interior surface of the cylinder utilize a solution or dispersion of a polymeric material, which is sprayed onto the interior surface of the cylinder. The carrier solvent must then be evaporated and removed from the cylinder followed by heat treatment of the cylinder to melt and fuse the polymeric material.

The known spray coating methods for applying a coating of a polymeric material are subject to many problems. Such processes result in the application of a relatively thin, i.e., less than about 1 mm, coating. The relatively thin coating applied by the spray coating process is subject to pinholes due to the out-gassing of the carrier solvent. The metal of the cylinder can be attacked through such pinholes and subsequent failure of the cylinder can result.

The treatment of polymeric materials with fluorine to provide a fluorinated surface on the polymeric material is known. The direct fluorination of the surface of polymeric materials is usually accomplished using a mixture of fluorine and a carrier gas which reduces the aggressiveness of the fluorine. It is known to use nitrogen, helium and argon as the carrier fluid. U.S. Pat. No. 4,994,308, to Tarancon is directed to use of carbon dioxide as a carrier fluid to provide improved efficiency and removal of byproduct hydrogen fluoride.

The present invention is directed to a method for applying a uniform, relatively thick coating of polymeric material on the interior surface of a cylinder. The relatively thick coating of the polymeric material is particularly adapted to be cross-linked and fluoridated to provide improved resistance to attack by reactive gases.

It is therefore an object of the present invention to provide an improved method for applying a coating of a polymeric material onto the interior surface of a cylinder.

It is a further object of the present invention to provide a cylinder which has been coated with a uniform, relatively thick polymeric material which is free of pinholes and which is adapted to contain reactive gases.

It is a still further object of the present invention to provide a cylinder which has been coated with a polymeric material on the interior surface of the cylinder and wherein the treated neck portion of the cylinder is protected from contact with any gas which is stored in the cylinder.

Further objects, features and advantages of the present invention will become more apparent upon consideration of the detailed description of the invention taken in conjunction with the accompanying claims.

SUMMARY OF THE INVENTION

The present invention provides a method for coating the interior surface of a cylinder with a uniform, relatively thick layer of a polymeric material. The method includes the steps of dispersing a particulate polymeric material into the interior cavity of a cylinder. Any openings in the cylinder are then closed by a permanent apertured plug. The cylinder is then subjected to rotational movement while at the same time subjecting the cylinder to oscillation in a vertical plane. The polymeric material is then heated to a temperature above the melting point of the polymeric material, and maintained at that temperature for a time sufficient to coat the polymeric material onto the interior surface of the cylinder. The rotation and oscillation of the cylinder is then halted and the polymeric material is cooled to provide an interior relatively thick coating of the polymeric material.

DETAILED DESCRIPTION OF THE INVENTION

The cylinders to which the method of the present invention is particularly applicable are standard steel industrial cylinders for storage of gas which are closed at one end and which have a tapered threaded neck for reception of a valve in the other end. The polymeric materials useful in the method of the present invention are thermoplastic polymeric resins which have a melting point in the range of from about 275° F. to about 500° F. Polyolefins such as polyethylene and polypropylene, polyamides, are particularly suitable polymeric materials.

The polymeric material is used in a particulate form, such as a powder or pellet. The particle size of the polymeric material is preferably from about 20 to about 50 mesh, American standard sieve size. The particulate polymeric material is dispersed into the interior cavity of the cylinder. The polymeric material is added to the cylinder at a level sufficient to provide a coating of the polymeric material, having a thickness of from about 3 mm to about 15 mm, preferably from about 5 mm to about 10 mm. Such coating thicknesses are relatively thick for the cylinder industry and due to the thickness of the coating and the lack of use of a solvent, which must be out-gassed, the polymeric coating of the present invention is free of pinholes. A check for pinholes is made to discover the relatively few pinholes which do occur during the coating method of the invention.

Figure 1:
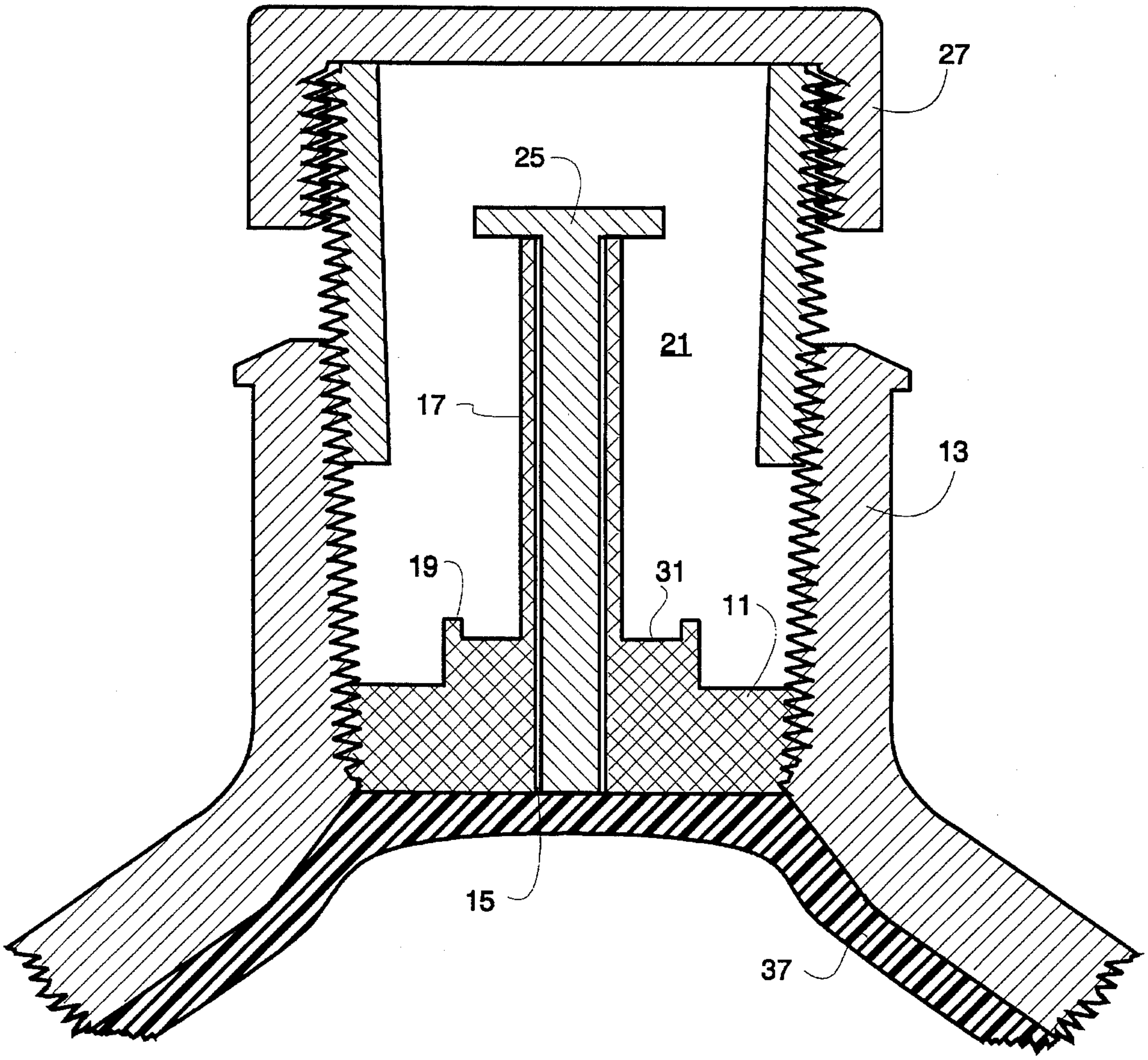
FIG. 1 is a cross sectional view of the top neck portion of a cylinder including an interior coating of a polymeric material applied in accordance with the method of the invention.
Figure 2:
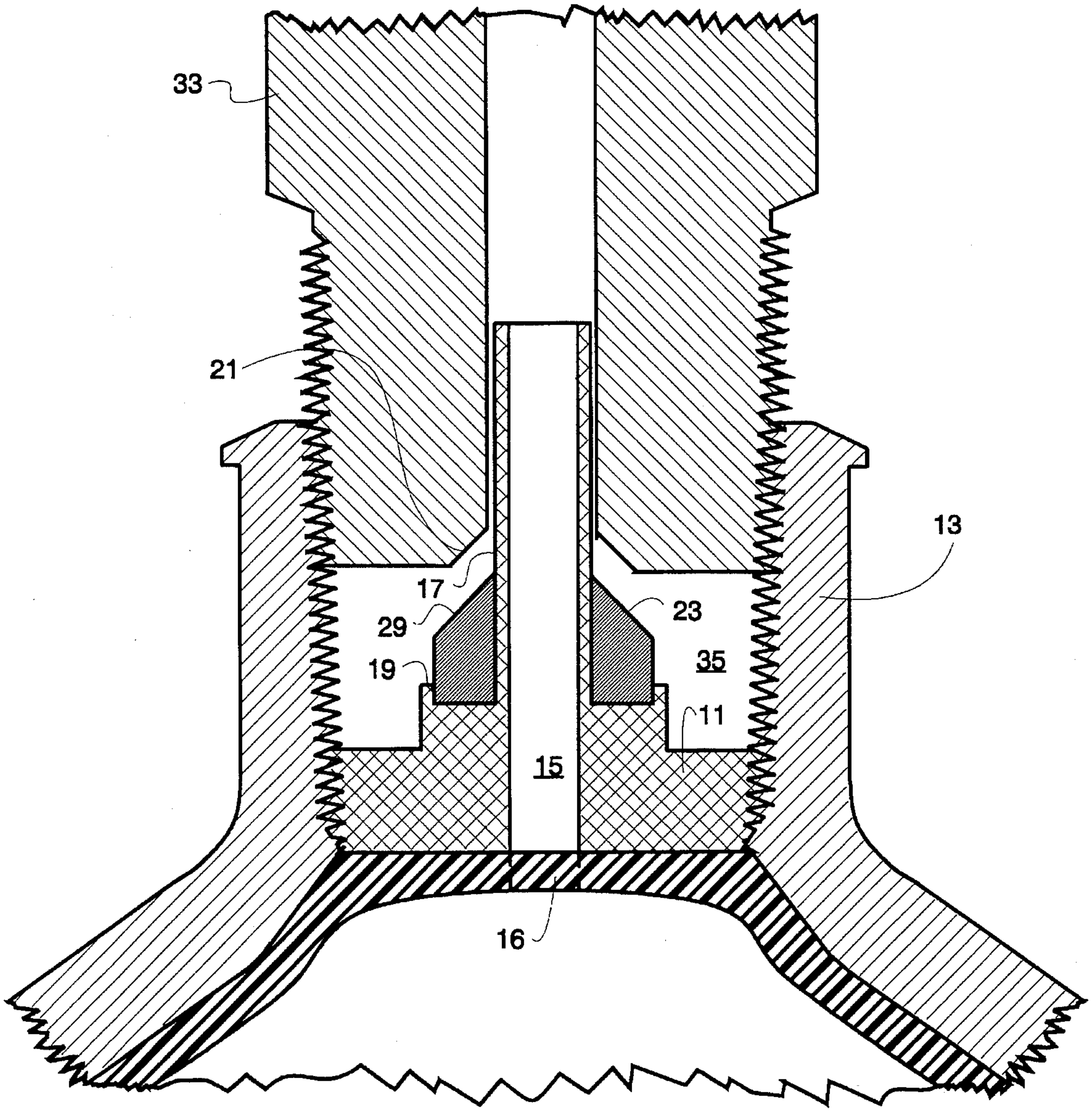
FIG. 2 is a cross sectional view of the top neck portion of the cylinder of FIG. 1 shown in an operating condition with the bottom portion of a valve threaded into place.

As shown in FIG. 1, a plug body 11 is threaded into the lowermost threads of a cylinder 13. The plug body has an aperture 15 therethrough. An ejector tube 17 extends upwardly from the top of the plug body 11. Plug body 11 and ejector tube 17 may be manufactured as an integral unit from a suitable material that is non-reactive with gas, such as stainless steel. Alternatively, plug body 11 and ejector tube 17 may be separate pieces, which are joined by a suitable method such as welding. Since plug body 11 will not come into contact with any gas stored in cylinder 13, plug body 11 can be made a from a material which is reactive with certain stored gases, such as carbon steel. Plug body 11 has an upstanding circumferential flange 19, which, in combination with ejector tube 17 forms a cavity 31 for receiving a deformable ferrule 23, as shown in FIG. 2.

A rod 25 having a closed end is inserted into ejector tube 17 to block the aperture 15 during the polymer molding process. A threaded plug 27 is fitted into the top of cylinder 13 to prevent the escape of any gas formed during the molding process. After the molding process has been finished, the plug 27 and rod 25 are removed. The polymeric material 16 which forms over the aperture 15 during the molding process is then cut away to provide a passage for stored gases to be removed from the cylinder.

After the polymeric material has been charged into the interior cavity of the cylinder, the interior cavity is blanketed with an inert gas, such as nitrogen, to prevent oxidation of the polymeric material. The threaded neck of the cylinder is then closed.

The cylinder is then subjected to motion in at least two planes. The first plane of motion is rotation which takes place around the central axis of the cylinder. The second motion is a vertical oscillation from one 45° angle through 90° to another 45° angle, which takes place about a horizontal axis, which is preferably orthogonal to said central axis. Preferably, the rotational movement is at a speed of from about 3 to about 10 revolutions per minute (rpm) and the oscillation is at a rate of from about one oscillation every 80 to 120 seconds. The swing time for each oscillation takes from about 3 to about 5 seconds.

While the cylinder is being subjected to roll and oscillation, the polymeric material is heated to the melting point of the polymeric material. After the polymeric material is charged into the cavity of the cylinder, roll and oscillation is commenced and the polymeric material is brought up to a first temperature and maintained at that temperature until the temperature of the polymeric material has been stabilized. This first temperature is the melting point of the polymeric material. The time required to stabilize the temperature of the polymeric material at the induction melt temperature is from about 60 minutes to about 3 hours, dependent upon the size of the cylinder and the charge of the polymeric material.

The polymeric material is then brought to a temperature of from about 25° F. to about 75° F. above the melting point of the polymeric material and is maintained at that temperature for a time sufficient to melt the polymeric material and to coat the polymeric material onto the interior surface of the cylinder. The time required to effect melting and coating of the polymeric material onto the interior of the cylinder and the plug body depends, of course, on the particular polymeric material used. For polyethylene, the time will vary from about 60 minutes to about 3 hours.

Polymeric materials, such as polyethylene, are supplied in grades which can be cross-linked to a slight extent. Cross-linking of linear polymers requires heating to a temperature above the melting point of the polymer. For polyethylene, the cross-linking temperature would be about 325° F. Accordingly, after the coating cycle is finished, the cylinder would be heated to a temperature of 325° F. and would be maintained at that temperature for from about 30 minutes to about 3 hours, while rotation and oscillation is continued.

After cross-linking takes place, the polymer coat will not deform and rotation and oscillation can be stopped. The cylinder is then cooled, preferably by immersing the cylinder in water.

The cylinder may also be pressurized with an inert gas after cooling to provide a more even coating. Pressurization is preferably effected with nitrogen for a period of from about 5 minutes to about 20 minutes at a pressure of from about 25 psig to about 100 psig.

After the cylinder is cooled, the cylinder is subjected to testing for pinholes and to a hydrostatic test.

As shown in FIG. 1, the polymeric coating 37 extends past the juncture where the threaded neck of the cylinder joins the side wall of the cylinder onto the plug body 11. This is highly desirable, since this juncture is a sharp angle and the polymeric coating could more easily pull away from the cylinder during subsequent use if a valve were to be threaded repeatedly into contact with the polymeric coat to prevent attack of the gas on the threads. The use of plug body 11 reduces the juncture angle. In this connection, the bottom surface of plug body 11 could be a curved shape to further reduce this angle.

In one embodiment of the invention, after the cylinder has been certified to be free of pinholes and hydrostatically certified, the cylinder is dried and a valve is inserted into the cylinder to prepare for fluorination. Fluorination is desirable to further improve the barrier properties of the cylinder. Fluorination may be effected by adding an atmosphere containing from about 3% to about 10% fluorine with the balance being carbon dioxide or other carrier gas. The fluorine atmosphere is preferably added to an evacuated cylinder to provide approximately 700 torr. The cylinder is allowed to stand with the fluorine atmosphere in place for a period of from about 30 minutes to about 2 hours. After fluorination, the fluorinated atmosphere is purged from the cylinder, the cylinder is evacuated and tested for out-gassing.

After the polymeric material has been formed on the interior, ferrule 23 is then placed into position in cavity 31. Ferrule 23 is made from a suitable deformable or elastomeric material which is nonreactive with gases stored in the cylinder. Suitable materials include soft metals, such as lead, and elastomeric materials, such as polyurethane. As shown in FIG. 2, ferrule 23 has a conical seating surface 29 which mates with a similar conical surface 21 on valve 33. When valve 33 is screwed down into contact with ferrule 23, ferrule 23 is deformed into a sealing relationship with valve 33 to prevent gas entering into the void space 35 between valve 33 and plug body 11 through the loose fit between ejector tube 17 and valve 33. The threads of the cylinder in void space 35 are protected from the gas as gas is dispensed from the cylinder.

The following example illustrates various features of the invention in a preferred embodiment, but is not intended to in any way limit the scope of the invention as set forth in the appended claims.

EXAMPLE

An H style cylinder having the dimensions of 9 inches diameter by 57 inches length, a water capacity of 43.6 liters and an average weight of 130 pounds was coated with polyethylene in accordance with the method of the invention. The coating method consisted of the following steps.

1. Prepare the cylinder walls by degreasing, shot blasting, baking and air drying to remove debris as well as moisture.

2. Purge with nitrogen.

3. Inject cylinder with 9.5 liters of PE 7004 cross-linkable polyethylene resin from Paxon Polymer Corp. and purge with $N_2$.

4. Thread a plug body with ejection tube and aperture closing rod into the neck of the cylinder.

5. Install a ¾"×¾" male nipple fitted with a closing plug to completely seal the cylinder.

6. Begin coating unit pre-heat by setting the electric heaters at 380° F. with the unit in a horizontal position.

7. After 90 minutes, begin oscillation of the unit to even out the heating temperature.

8. After oscillating for 30 minutes, determine the temperature. The total pre-heat time has now been 2.25 hours.

9. Begin rotation at about 5 rpm with oscillation stop times approximately 100 seconds from end-to-end. The swing time for each oscillation is 5 seconds end-to-end.

10. Continue with the heaters set at 380° F. for 15 minutes and then reduce heater set points to 345° F. with continued oscillation and rotation.

11. Maintain the heater set points at 345° F. for 2.75 hours. This is the induction time required for the cylinder and the resin to be heated to the polyethylene melting point and fusion of the polyethylene to the metal surface to begin. Also taking place is fusion between the polyethylene particles.

12. Increase the heater set points to 383° F. with continued oscillation and rotation.

13. Maintain the heater set points at 383° F. for 2.25 hours. This is the completion of the fusion time and also the additional temperature increase activates the hydrogen peroxide cross-linking system and drives it to completion.

14. Discontinue the oscillation and rotation and place the cylinder into a cold water bath as soon as possible to avoid any possible direct overheating of any area of the cylinder when stationary.

15. Remove the cooled cylinder from the immersion bath, dry the threaded neck end and remove the ¾"×¾" male nipple with plug.

16. Remove the ejector tube stopper rod. Insert a knife-edge cutting tube with centered pilot screw into the ejector tube and with a clock-wise and downward pressure, cut to the polymer at the base of the ejector tube and pull out the plug polymer.

17. When cylinder is cooled, visually inspect and if acceptable, test for pinholes by use of a high voltage technique.

18. Once the cylinder has passed the pinhole test, hydrostatically test the cylinder.

19. After cylinder has been hydrostatically certified, dry and valve cylinder to prepare for fluorination.

20. Evacuate the cylinder with a vacuum pump to 100 torr and add 5% fluorine with balance carbon dioxide mixture to evacuated cylinder to approximately 700 torr. Allow the cylinder to stand one hour with gas mixture.

21. Purge and evacuate cylinder.

22. Test the cylinder for out-gassing.

Various modifications, changes and substitutions may be employed in the use of the present invention and, in some instances, some features of the invention will be employed without a corresponding use of other features. Accordingly, the appended claims should be construed in a manner consistent with the spirit and scope of the invention herein.

What is claimed is:

1. A steel cylinder adapted for containing corrosive gases without exposing any part of the cylinder including the threaded neck to exposure to the gas contained therein comprising:

a) a steel cylinder having a threaded neck;

b) a plug body having exterior threads which is threaded into position on the lowermost threads of said threaded neck of said cylinder, said plug body having a central aperture, an ejector tube extending upwardly from said aperture into said threaded neck and a circumferential flange extending upwardly from said plug body and spaced from said ejector tube to provide a toroidal cavity;

c) a thick, pinhole free polymeric coating on the interior of said cylinder covering the entire interior cavity of said cylinder and the lowermost surface of said plug body; and d) a deformable toroidal ferrule disposed around said ejector tube in said cavity in a position such that when a threaded valve body is positioned in said threaded neck, said ferrule is deformed against said ejector tube to provide a gas tight seal between said ejector tube and the void space between the valve body and the plug body.

2. A steel cylinder in accordance with claim 1 wherein the polymeric coating has a thickness of at least about 3 mm.

3. A cylinder in accordance with claims 1 or 2 wherein said polymeric coating is from a polymeric material which is selected from the group consisting of polyethylene and polypropylene.

4. A cylinder in accordance with claim 3 wherein said coating is formed by heating the polymeric material to a temperature high enough to cause a partial crosslinking of said polymeric material.

5. A cylinder in accordance with claim 4 wherein the polymeric material is adapted to crosslink at from about 25° F. to about 100° F. above the melting point of said polymeric material.

6. A cylinder in accordance with claim 5 wherein said polymeric material is polyethylene.

* * * * *

UNITED STATES PATENT AND TRADEMARK OFFICE

CERTIFICATE OF CORRECTION

PATENT NO. : 5,474,846

DATED : December 12, 1995

INVENTOR(S) : George A. Haldenby

It is certified that error appears in the above-indentified patent and that said Letters Patent is hereby corrected as shown below:

On the title page, item [73] Assignee: Liquid Carbonic Corporation, Oak Brook, Illinois.

under item [56], Attorney, Agent or Firm: Fitch, Even, Tabin & Flannery.

Signed and Sealed this

Twentieth Day of August, 1996

Attest:

BRUCE LEHMAN

Attesting Officer

Commissioner of Patents and Trademarks